United States Patent [19]

Descrovi et al.

[11] 4,247,278
[45] Jan. 27, 1981

[54] PRESSING MACHINE ARRANGEMENT

[75] Inventors: Mario Descrovi, Borgaro T.SE; Gualberto Bruno, Cortazzone; Lino Giusti, Turin; Marco Milani, San Mauro; Aldo Giorgetti, Settimo T.SE, all of Italy

[73] Assignee: Europress S.a.s. di Giusti Lino & C., Turin, Italy

[21] Appl. No.: 55,329

[22] Filed: Jul. 6, 1979

[30] Foreign Application Priority Data

Jul. 11, 1978 [IT] Italy ............................. 68631 A/78

[51] Int. Cl.³ .......................... B30B 1/32; B29F 1/00; B29C 3/00
[52] U.S. Cl. .................................. 425/408; 425/590; 425/451.2
[58] Field of Search ............... 425/451.2, 590, 394, 425/406, 408, 411

[56] References Cited

U.S. PATENT DOCUMENTS

| | | | |
|---|---|---|---|
| 2,302,132 | 11/1942 | MacMillin et al. | 425/406 X |
| 3,446,879 | 5/1969 | Atkin | 425/394 X |
| 3,570,060 | 3/1971 | Stephenson | 425/406 X |
| 3,640,660 | 2/1972 | DeMets | 425/411 X |
| 3,799,728 | 3/1974 | Howard | 425/451.2 X |
| 4,128,376 | 12/1978 | Albertaggi | 425/451.2 X |

Primary Examiner—J. Howard Flint, Jr.
Attorney, Agent, or Firm—Merriam, Marshall & Bicknell

[57] ABSTRACT

A pressing machine arrangement, comprising at least two dies defining a molding cavity is described.

The main feature of this machine is to comprise means for adjusting the thrust pressure exerted at least on one of the said dies (22, 255), substantially in every region of the said dies, in order to maintain substantially mating, during the stage of maximum thrust, the contours of the said dies (22, 7, 255, 332) which define the said molding cavity, by means of an analogous deformation for the said two dies. Said means comprise a cylinder (77, 213) whose head (76, 216) acting into the said dies has a relatively reduced thickness, so as to allow its deformation.

4 Claims, 4 Drawing Figures

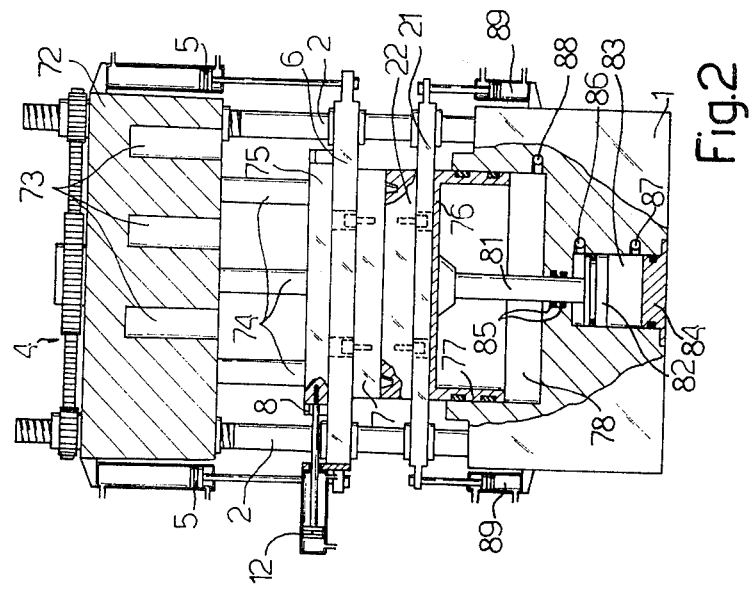
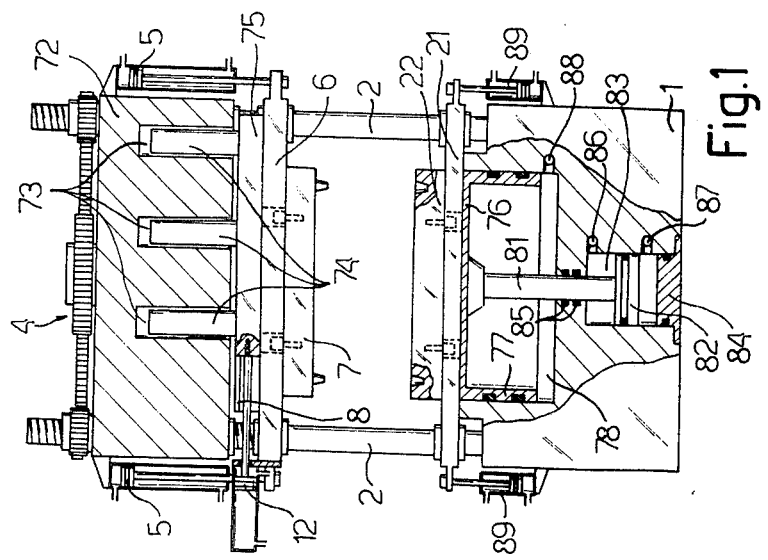

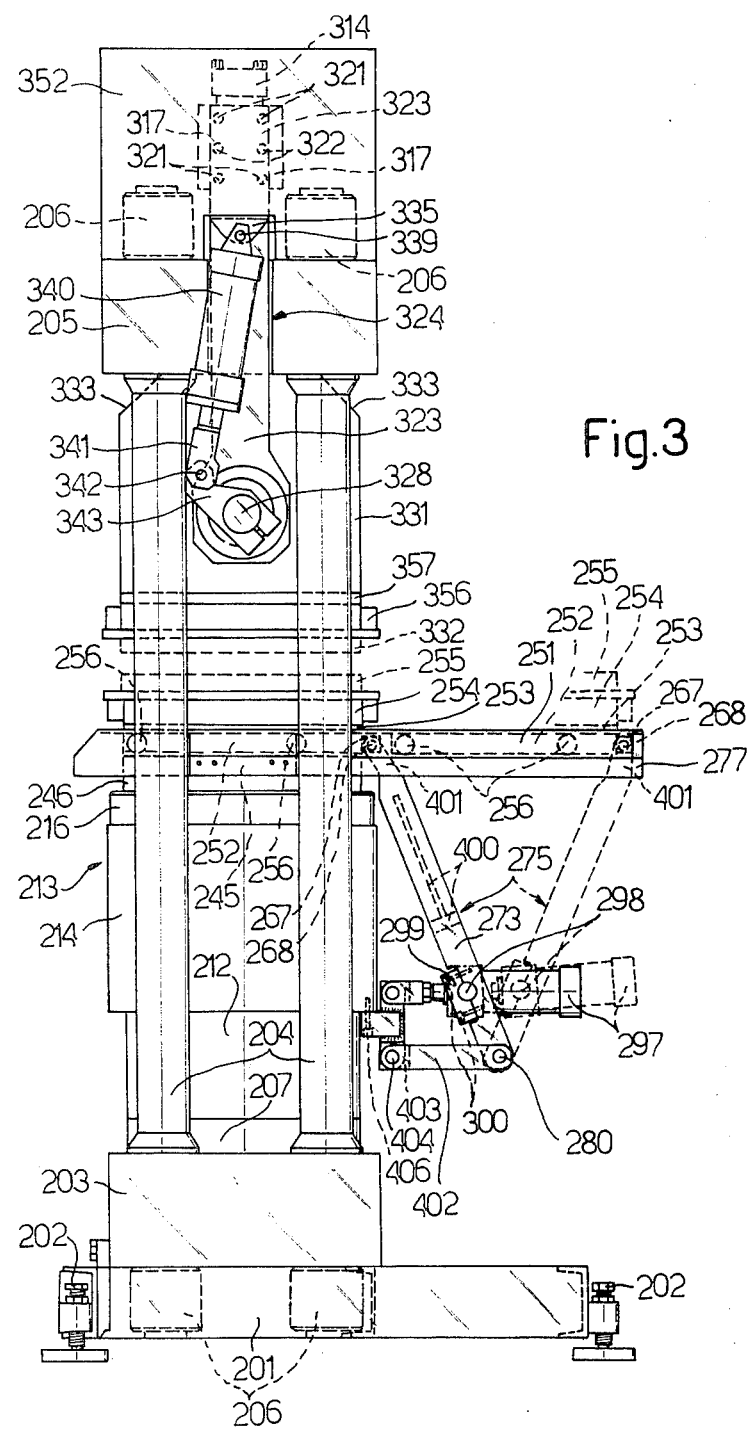

PRESSING MACHINE ARRANGEMENT

BACKGROUND OF THE INVENTION

The present invention relates to a pressing machine arrangement for pressing machines in general, for example polymer molding machines, machines for molding thermoplastic materials, pressure die-casting or punching or drawing machines, etc.

As it is well-known, such machines comprise at least two dies, between which a thrust pressure is exerted which cooperates in originating the desired product. In order that this product has the required characteristics, the contours of the die cavities, which have to define the shape of the product, in the condition of the maximum thrust exerted must remain perfectly mating with one another. This does not occur in the prior art machines, whose structure, at the moment of the maximum compression of the dies, is subjected to deformations which may be prejudicial to the quality of the product.

For example, in the compression or injection molding machines for polymers, because of the deformation of the structure irregular deformations take place in the dies, in particular in the machines utilizing a massive and large thrust piston, (generally, the deformation follows a cambered contour, with a maximum deformation in the central region), and it happens that the contiguous edges of the molding cavities disjoin at least partially and that the product is formed with burr, which has to be removed later, thus increasing the cost of production.

SUMMARY OF THE INVENTION

It is an object of the present invention to provide a pressing machine arrangement which will eliminate the disadvantages mentioned herein above, i.e. will allow to eliminate the disadvantages deriving from the different deformation of the dies during the thrust stage and thus will allow to obtain a completely finished product having the desired characteristics, and in addition will have a high efficiency with a relatively simplified construction, hence a relatively low cost of production, as well as a simplified assembling and maintenance.

Other objects and advantages of the arrangement according to the present invention will become apparent from the following detailed description.

Therefore, in accordance with the present invention a pressing machine arrangement is provided, comprising at least two dies which define a molding cavity, comprising means for adjusting the thrust pressure exerted at least on one of the said dies, substantially in every region of the said dies, in order to maintain substantially mating, during the stage of maximum thrust, the contours of the said dies which define the said molding cavity, by means of an analogous deformation for the said two dies, the said means comprising a cylinder whose head acting onto the said dies has a relatively reduced thickness, so as to allow its deformation.

BRIEF DESCRIPTION OF THE DRAWINGS

For a better understanding of the present invention some embodiments of the invention will now be described in detail, by way of non limiting examples, with reference to the accompanying drawings, in which:

FIGS. 1 and 2 are partially sectional front views, in two different positions of operation, of a first embodiment of a machine arrangement according to the present invention.

FIG. 3 is a side view of a second embodiment of a machine arrangement according to the present invention.

DETAILED DESCRIPTION OF THE INVENTION

Figure 4:
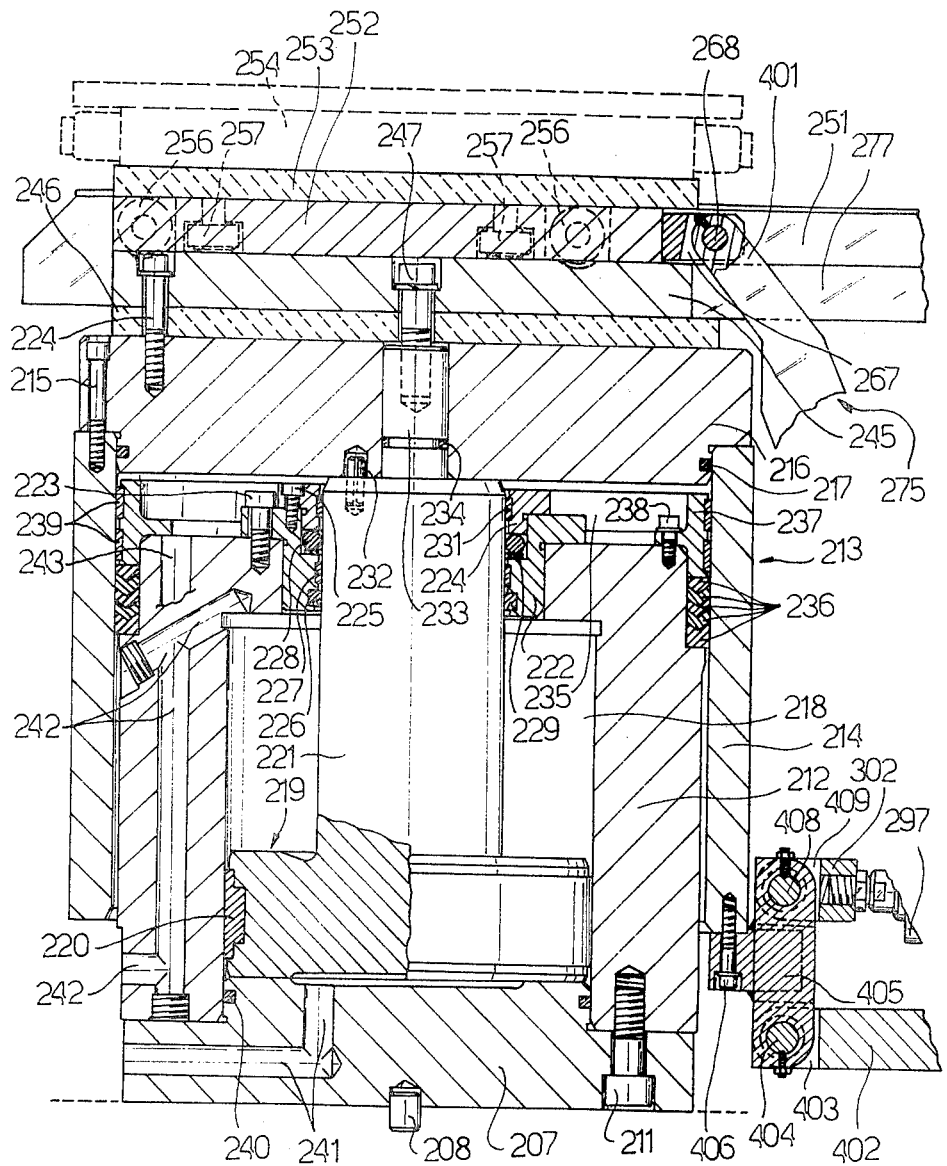
FIG. 4 is a sectional side view of a thrust assembly of the machine shown in FIG. 3.

Referring now to FIGS. 1 and 2 there is shown a first embodiment of a molding machine arrangement according to the present invention. This machine arrangement is provided with a base 1 supporting at its corners four columns 2 on the upper end of which a portion 72 is fixed whose position on the end of the columns 2 may be adjusted by means of a known adjusting belt and gear system 4. Connected to the two sides of the said portion 72 are two double-acting pistons 5 whose rod, at the lower end, is fixed to a plate 6 guided by the columns 2 and having fixed thereto, at its lower side, an upper die 7. Fixed on the plate 6 are two side guides 8, between which there is disposed a plate 75 having fixed thereto the end of a rod of a double-acting piston 12 fastened to one side of the plate 6. Moreover, portion 72 is provided with holes 73 serving to accomodate therein cylindrical columns 74 which originate from the upper side of the plate 75.

A plate 21 which has fixed thereto a lower die 22 and is inserted at its four ends onto the columns 2, abuts against a head wall 76, of relatively reduced thickness, of a cylinder 77 disposed in a hole formed in the base 1. Resting on the said wall 76 is also the upper end of the rod 81 of a piston 82 accommodated within a hole 83 provided in the base 1. The said hole 83 is closed at its lower end by a plug 84 and the communication between the hole 83 and the hole 78 is obtained by means of a circular opening in which there are disposed two annular seals 85 and which allows only the passage of the rod 81. Connected to the lower and upper regions of the said hole 83 are two conduits 86 and 87, whilst to the lower region of the hole 78 a conduit 88 is connected. Moreover, the four apexes of the plate 21 are connected to the upper end of the rods of corresponding double-acting pistons 89.

Referring now to the embodiment shown in FIGS. 3 and 4, the molding machine according to the present invention comprises a base frame 201 provided with adjustable legs 202 and having a base block 203 which supports four vertical columns 204 disposed according the apexes of a square. Towards the upper zone, the vertical columns 204 support an upper block 205 whose position relative to the columns 204, as well as the position of the base block 203 relative to the said columns 204, is determined by adjusting elements 206 at the ends of the columns 204. Fixed on the base block 203 by means of screws (not shown) is a base 207 having a circular cross-section, which base is centered on the block 203 by means of a centering pin 208 (FIG. 4). Fixed in the base 207 by means of screws 211 is a cylindrical body 212, on the outer side surface of which there is slidable axially a thrust cylinder 213 which is formed by means a cylindrical wall 214 having fixed on its upper portion by means of screws 215 a body 216 of circular cross-section, which forms the head of the cylinder 213 and whose thickness (about 4 cm) is considerably smaller than the height of the cylinder 213 (about 30 cm). Towards the lower region, within the body 216 there is disposed an annular seal 217 which rests on the cylindrical wall 214.

The cylindrical body 212 defines in the interior a cylindrical chamber 218, inside which there is sealingly slidable axially the head of a piston 219, on the side surface of which a resilient ring 220 is disposed. The said piston 219 has a rod 221 which projects from the upper side of the cylindrical body 212 and traverses axially a first body 222 which is fixed in the upper region of the body 212 by means of screws 223, and a second body 224 which is fixed on the first body 222 by means of screws 225. Thus, around the rod 221 cooperate an annular seal 226 and a guide ring 227 which are accommodated in the first body 222, an annular seal 228 accomodated between the bodies 222 and 224, with the interposition of an annular element 229, and a guide ring 231 accomodated in the second body 224. Therefore, the upper base of the rod 221 rests on the lower surface of the body 216 of the thrust cylinder 213 and is centered relative to this cylinder by means of centering pin 232. Originating from the upper region of the rod 221 are an axial section 233 of reduced diameter, about which there is inserted an annular seal 234 and which is lodged in an axial hole of corresponding cross-section formed in the body 216. Thus, between the thrust cylinder 213 and the cylindrical body 212 there is defined a thrust chamber 235 whose tightness is ensured by means of a plurality of annular seals 236 which are incorporated into the sidewall of the cylindrical body 212, by means of a cooperating fastening action exerted by the lower edge of an annular body 237 fixed onto the upper annular edge of the cylindrical body 212 by means of screws 238. The said annular seals 236 are sealingly resting on the inner surface of the cylindrical wall 214, and resting on the said inner surface are also two guide rings 239 built-in into the annular body 237. An annular seal 240 is, in its turn, built in into the base 207, to ensure the tightness of the chamber 218, in the inner lower portion of the body 212. Thus, in the base 207 there are formed conduit sections 241 for the communication with the lower portion of the chamber 218, and in the cylindrical body 212 there is provided a first series of conduit sections 242 for the communication with the upper portion of the cylindrical chamber 218, and a second series of conduit sections 243 for the communication with the thrust chamber 235.

Fixed on the body 216 of the thrust cylinder 213 by means of screws 244 and with the interposition of a body 246 made of a thermoinsulating material, conveniently asbestos, is a plane and substantially rectangular support body 245. Also the section 233 of the rod 221 of the piston 219 is connected to the body 245 by means of an axial screw 247.

Fixed on the sidewalls of the support body 245 by means of screws 250 are two elements 251 having a L-shaped cross-section with the base disposed in the upper portion and turned towards the interior. The said elements 251 act as sliding guides for a movable carriage 252, which also is substantially rectangular in shape and supports, in its upper portion, in a well-known manner, a plate 253 of thermoinsulating material, conveniently asbestos, and a plate 254 containing heating elements and having, in its upper portion, a support plate of a lower die 255. The said plates 253 and 254 and the said die 255 are superimposed, and the area of the surface of the die 255 is substantially equal to the upper area of the body 216 of the thrust cylinder 213.

The said movable carriage 252 is provided with two pairs of coaxial rollers 256, which have a horizontal axis and are slidable on the support body 245, and two pairs of rollers 257, which are disposed with their axis in a vertical direction so as to slide on the inner side surfaces of the guide elements 251.

In the central front region of the movable carriage 252 there is fixed a perforated connection body 267, into which there is inserted a pin 268 which passes through end portions 401, provided with respective axial holes, of a lever arm 275. This arm 275 is composed of two elements 273 which are connected to one another by crosspieces 400.

In the lower region, the said arm 275 is connected by a pin 280 to an end of an arm 402 which at its other end terminates with two tabs 403, perforated coaxially, into which there is inserted a pin 404 supported by a T-shaped body 405 fixed by means of screws 406 to the lower region of the cylindrical wall 214 of the thrust cylinder 213. Inserted into the other end of the body 405 is a pin 408 which supports two tabs 409 formed by a head 302 of a hydraulic jack 297 which has connected thereto, at its outer portion, a pin 298 engaged with an intermediate region of the lever arm 275 by means of a closing body 299 fixed to the arm 275 by means of screws 300.

Upper block 205 is substantially rectangular in shape and in its upper portion there is locked the head of a rod of a "flow dynamic" element or hydraulic jack 314, which is disposed vertically with its rod extending downwards. The outer body of the said jack 314 is fixed to a structure 317 having fixed to its lateral ends by means of screws 321 and centering pins 32 two lateral arms 323 which extend downwards by passing into cavities 324 formed in the upper block 205.

Supported in the lower portions of the said two arms 323 are the ends of two shafts 328 which, at their other end, are fixed to a body 331 which also has in its lower portion an insulating plate 357 and a heating plate 356 carrying an assembly plate of an upper die 332. The said body 331 is provided in its upper portion with two walls 333 chamfered 45°. Fixed to one of the lateral arms 323 is a body 335 having pivoted thereon by means of pivot 339 one end of an hydraulic jack 340, onto the rod of which there is fixed a body 341 connected by means of a pin 342 to a fork-shaped arm 343 which is coupled about an end section of the shaft 328 by rigid angular connection.

Above the upper block 205 there is disposed a protection cover 352.

The operation of the molding machine realized in accordance with the teachings of the present invention is as follows.

Referring to the embodiment shown in FIGS. 1 and 2, the machine shown therein is a machine for the molding of polymers in general. In fact, the material which has to be molded is introduced into the molding cavity defined by the two dies 7 and 22. The first stage of the molding operation consists in the actuation of the two pistons 5, whereby the plate 6 moves downwards, with the upper die 7 and the plate 75, so that the columns 74 come out from the holes 73 of the portion 72. The said plate 75 is then moved to the left by means of the piston 12, so that the upper ends of the columns 74 result in being situated in correspondence with the solid surface of the portion 72. At this point (see FIG. 2), a thrust is exerted onto the plate 21, and consequently onto the lower die 22, by means of the cylinder 77 whose upper wall 76 has a relatively reduced thickness, so that it can be deformed as necessary to allow obtaining also in the lower die 22 the same deformation which is present in the upper die 7 during the said stage of maximum thrust. The displacement and the deformation of the said cylinder 77 take place by feeding oil into the conduit 88, at the appropriate pressure. Moreover, by means of the rod 81 of the piston 82 it is possible to increase or adjust in the desired manner the thrust pressure exerted in the central portion of the plate 21.

Therefore, by creating in the two dies 7 and 22 a substantially identical deformation, practically the situation is the same as when no deformation exists in the said dies, and thus the disadvantages of the prior art are eliminated, so that the products obtained are perfectly finished without any burr on the edges, etc.

The return of the assembly to the initial conditions shown in FIG. 1 is then obtained by the opposite actuation of the cylinder 77 (by means of the pistons 89) and the piston 82 (by means of feeding to the conduit 86), and by means of the pistons 12 and 5.

As regards the embodiment shown in FIGS. 3 and 4, the material which has to be molded is introduced into the cavity of the two dies 255 and 332. In this stage, the upper die 332 is disposed vertically and is turned towards the front region of the machine, and the lower die 255 is in its extracted position towards the outside. In the subsequent stage the machine assumes the configuration shown in FIG. 3, inasmuch as the hydraulic jack 340 is actuated, whereby the body 331 is rotated clockwise by 90° about the shafts 328, and subsequently the hydraulic jack 34 is actuated, whereby the structure 317 is lifted relative to the block 205 and consequently the two lateral arms 323 are moved vertically, so as to bring the upper surface of the body 331 to bear against the lower surface of the block 205.

Thus, the hydraulic jack 297 is actuated, so that the lever arm 275 describes a rotation section anticlockwise about the pivot 280 and withdraws the carriage 252.

At this point, oil under pressure is introduced through the conduits 243 into the thrust chamber 235, so that the thrust cylinder 213 is lifted, which cylinder, by carrying out a travel for example of four centimeters, lifts the whole assembly comprising the support body 245, the movable carriage 252 and the lower die 255, bringing it against the upper die 332. In this condition of maximum thrust exerted through the cylinder 213, since the thickness of the body 216 is relatively reduced, relative to the height of the said cylinder 213, the said body 216 can conveniently deform so that the molding cavities of the dies 255 and 332 have their contours perfectly mating, in order to obtain a high quality molded product. Moreover, by introducing oil under pressure, through the conduits 241, into the lower portion of the chamber 218 it is possible to exert a thrust onto the head of the piston 219, which, by means of the rod 221, gives rise to an auxiliary thrust in the central portion of the body 216.

After an appropriate period of time, depending on the operative stages of the machine, oil is introduced through conduits 242 into the upper portion of the chamber 218, which pushes downwards the piston 219 and, consequently, brings back the thrust cylinder 213 to its lowered position. The assembly of the lever arm 275 with the elements connected to it follows the displacement of the thrust cylinder 213, inasmuch as it is connected to this cylinder 213 by means of the screws 406.

The advantages obtained by the molding machine arrangement according to the present invention are obvious from the foregoing description. Moreover, the realization of the thrust cylinder 213 (FIG. 4) is relatively simple and consequently relatively economical, because of its particular configuration, owing to which it slides outside the fixed cylindrical body 212. Moreover, the said cylinder 213, being disposed outside the cylindrical body 212, has a free area inside the body 216, forming the head of the thrust cylinder 213, which is relatively large, i.e. wider than that of the thrust cylinders disposed within the relatively fixed body, the outer dimensions being equal, and the said area is substantially proximate to the area of the base surface of the lower die 255 onto which it acts. Such wider area of the body 216 allows obtaining the same thrust power with a lower actuation pressure, or, the actuation pressure being equal, higher thrust powers.

Finally, it is clear that the described embodiments of the molding machine according to the present invention is susceptible of modifications and variations without departing from the scope of the invention itself. For example, the ratio between the total height of the thrust cylnder and the thickness of its head, as a function of the dimensions of the cylinder, its travel and the mower of the machine, and preferably this ratio is higher than 3. Also, the various systems for the displacement of the upper die and the systems for the sliding of the lower die outwards can be varied.

What we claim is:

1. A press having two dies defining a mold cavity and comprising means for adjusting a thrust pressure exerted on at least one of the dies, over substantially a whole area of the said die, in order to maintain mating contact between surfaces defining the mold cavity under maximum thrust conditions, the said means comprising a hollow cylinder with a head which acts on the said die and is of a thickness smaller than the height of the cylinder, such as to allow deformation of the cylinder head, and wherein the lateral wall of the cylinder surrounds a fixed structure to define a chamber into which fluid can be introduced to press the cylinder head against the said die, and sealing elements for said chamber and cooperating with the cylinder interposed between the cylinder wall and said fixed structure.

2. A press as claimed in claim 1, wherein the area of the cylinder head is substantially equal to the area of the base of said die.

3. A press as claimed in claim 1, including a piston acting on the central internal region of the cylinder head.

4. A press as claimed in claim 1, wherein the thickness of the said head is smaller than one third of the height of the said cylinder.

* * * * *